(12) United States Patent
Hosokawa et al.

(10) Patent No.: US 6,680,363 B2
(45) Date of Patent: Jan. 20, 2004

(54) PROCESS FOR PRODUCING POLYIMIDE

(75) Inventors: Katsumoto Hosokawa, Tokyo (JP); Yuuki Honda, Tokyo (JP); Seiji Kamimura, Tokyo (JP); Yoshiyuki Ando, Tokyo (JP); Kenji Asano, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 2 days.

(21) Appl. No.: 10/052,566

(22) Filed: Jan. 23, 2002

(65) Prior Publication Data

US 2002/0099166 A1 Jul. 25, 2002

(30) Foreign Application Priority Data

Jan. 23, 2001 (JP) ........................................ 2001-014768

(51) Int. Cl.[7] ........................ C08G 73/10; C08G 69/26; C08G 69/28
(52) U.S. Cl. ........................ 528/170; 528/125; 528/126; 528/128; 528/171; 528/172; 528/173; 528/174; 528/176; 528/183; 528/185; 528/188; 528/220; 528/229; 528/350; 528/352; 528/353

(58) Field of Search ................................. 528/353, 170, 528/125, 126, 128, 172, 173, 174, 176, 183, 185, 188, 220, 229, 350, 352

(56) References Cited

U.S. PATENT DOCUMENTS

| 5,037,862 A | * | 8/1991 | Nishizawa et al. | .......... 523/223 |
| 5,502,143 A | | 3/1996 | Oie et al. | .................... 528/128 |
| 5,518,864 A | * | 5/1996 | Oba et al. | .................... 430/325 |
| 5,686,525 A | * | 11/1997 | Maruta et al. | .............. 524/600 |
| 5,840,369 A | * | 11/1998 | Maruta et al. | .............. 427/282 |

FOREIGN PATENT DOCUMENTS

JP 02103231 A * 4/1990

* cited by examiner

*Primary Examiner*—P. Hampton-Hightower
(74) *Attorney, Agent, or Firm*—Foley & Lardner

(57) ABSTRACT

An acid dianhydride, together with a diamine, is heated in an organic polar solvent in the presence of γ-caprolactone or β-butyrolactone as an acid catalyst to prepare a polyimide having an average molecular weight of 10,000 to 300,000. This production process can realize the production of a polyimide which is soluble in a solvent and has high processability and stability.

2 Claims, No Drawings

PROCESS FOR PRODUCING POLYIMIDE

BACKGROUND OF THE INVENTION

1. Field of the Invention

The invention relates to a process for producing a polyimide, and more particularly to a process for producing a polyimide that can produce a polyimide which is soluble in a solvent and has high processability and stability.

2. Prior Art

Polyimides have been extensively applied as heat-resistant resins having excellent mechanical properties, electric properties, chemical resistance, weathering resistance and other properties in the field of electric and electronic industries. Polyimides, however, have low solubility in an solvent and thus cannot be prepared as a polyimide resin solution for casting or impregnation. For this reason, polyimides are produced by dissolving a polyamic acid, having high solubility in a solvent, as a precursor of a polyimide in an organic polar solvent to prepare a resin solution, processing the resin solution, and then conducting heat treatment and chemical treatment to cause a dehydration ring-closing reaction (Lee, Stoll, and Nevills, "Atarashii Tainetsusei Jushi (New Heat-resistant Resin)," Tokyo Kagaku Dozin Co., Ltd., p. 216).

The two-stage process, wherein processing is carried out in the state of polyamic acid followed by imidation, can compensate for low processability of the polyimide. In this process, however, since processing should be carried out in the state of polyamic acid, which is easily hydrolyzed in the presence of water, that is, has low stability, it is very difficult to stably provide high-quality product.

SUMMARY OF THE INVENTION

Accordingly, it is an object of the invention to provide a process for producing a polyimide that can produce a polyimide which is soluble in a solvent and has high processability and stability.

According to the first feature of the invention, a process for producing a polyimide having an average molecular weight of 10,000 to 300,000, comprises the step of heating an acid dianhydride and a diamine in an organic polar solvent in the presence of γ-caprolactone or β-butyrolactone as an acid catalyst.

The above diamine is preferably one or two or more compounds selected from the group consisting of

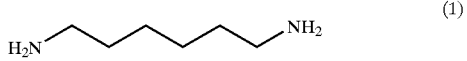 (1)

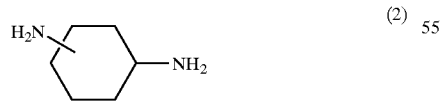 (2)

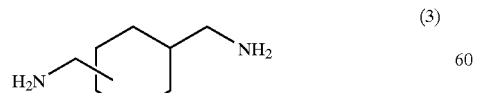 (3)

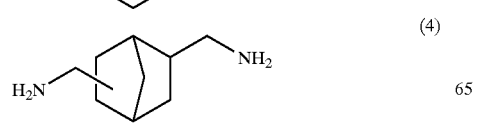 (4)

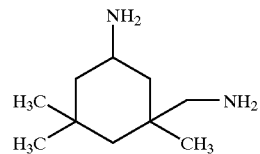 (5)

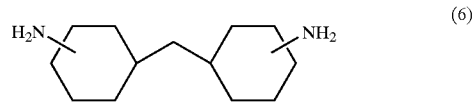 (6)

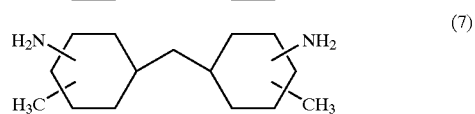 (7)

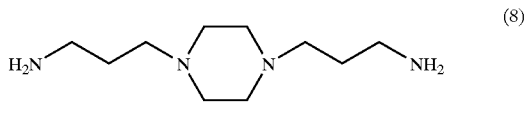 (8)

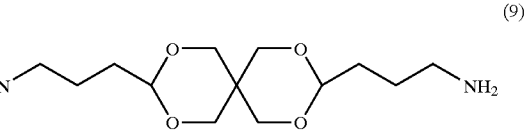 (9)

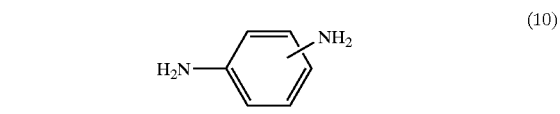 (10)

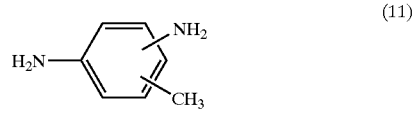 (11)

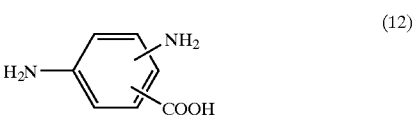 (12)

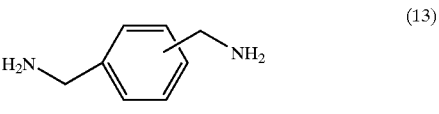 (13)

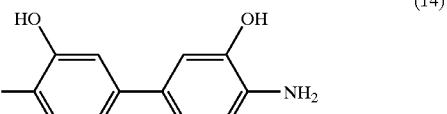 (14)

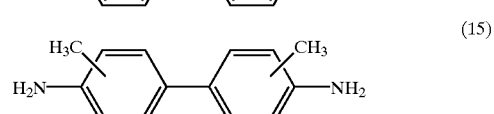 (15)

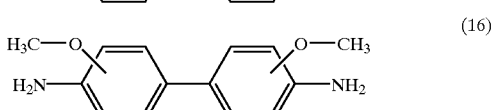 (16)

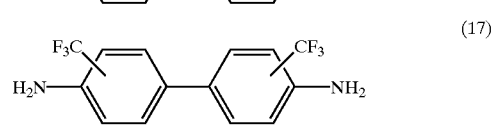 (17)

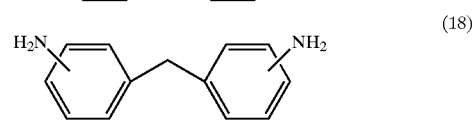 (18)

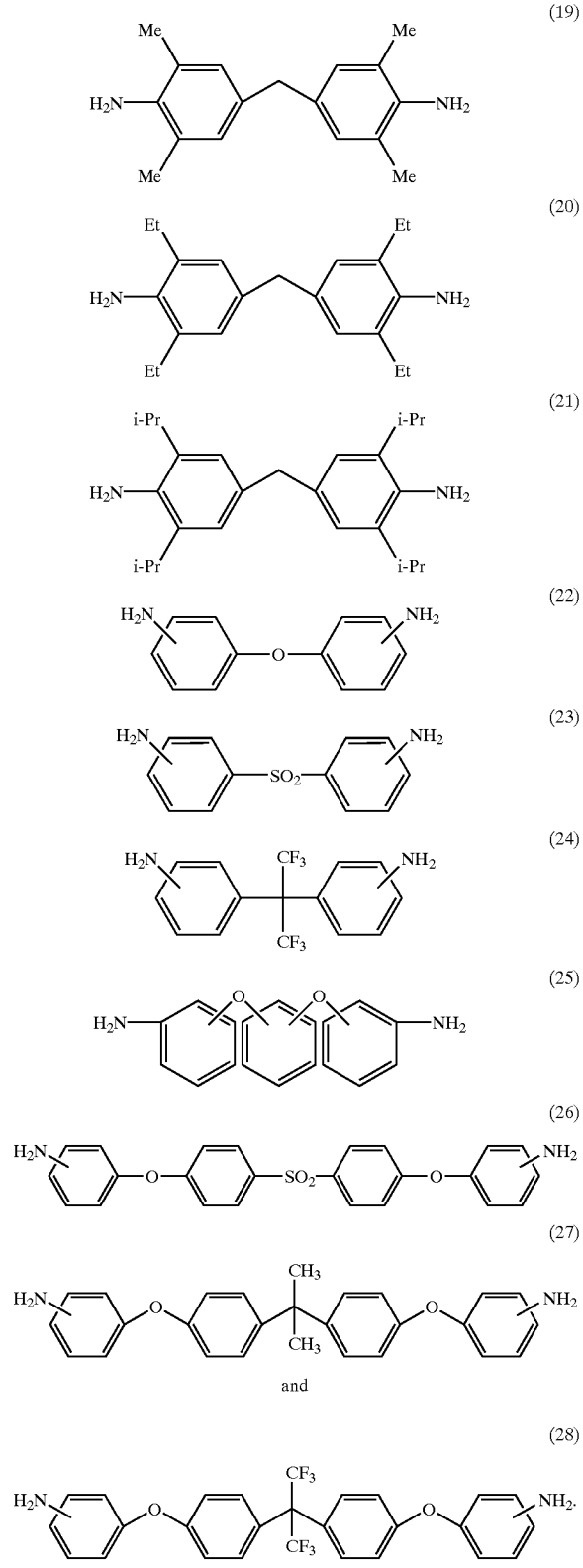

The acid dianhydride is preferably one or two or more compounds selected from the group consisting of In the invention, when a single diamine is reacted with a single acid dianhydride, a homopolymer is produced, while, when two or more diamines or two or more acid dianhydrides are used, a random or block copolymer is produced.

The use of γ-caprolactone or β-butyrolactone as an acid catalyst in an organic polar solvent can cause ring closing of polyamic acid comprising an acid dianhydride and a diamine and thus can produce a copolymerizable high-molecular weight polyimide in one stage.

Organic polar solvents usable herein include, for example, N,N-dimethylformamide, N,N-dimethylacetamide, dimethylsulfoxide, N-methyl-2-pyrrolidone, γ-butyrolactone, and 1,3-dimethyl-2-imidazolidinone.

EXAMPLES

Example 1

A ball tipped condenser equipped with a trap having a silicon cock was attached to a 1000-ml separable three-necked flask equipped with a mechanical stirrer. Bicyclo(2,2,2)oct-7-ene-2,3,5,6-tetracarboxylic acid dianhydride (hereinafter referred to as "BCD") (24.82 g), 15.21 g of 3,5-diaminobenzoic acid (hereinafter referred to as "DABz"), 1.0 g of γ-caprolactone, 1.6 g of pyridine, 200 g of NMP, and 30 g of toluene were placed in the flask, and the contents of the flask were stirred at room temperature in a nitrogen atmosphere for 10 min. The temperature was then raised to 180° C., and the contents of the flask were stirred for 3 hr. Water produced during the reaction was removed through the silicon cock. The polyimide thus obtained had a molecular weight of about 50000.

Next, the resin composition prepared above was coated onto a glass substrate, and the coating was dried in an infrared thermostatic chamber to form a polyimide resin layer (step 1). The polyimide was measured for an infrared absorption spectrum. As a result, absorption characteristic of an imide ring was observed at 1,715 cm$^{-1}$ and 1,785 cm$^{-1}$ (step 2).

Example 2

4,4'-Oxydiphthalic acid anhydride (hereinafter referred to as "ODPA") (31.02 g), 43.25 g of bis{4-(3-aminophenoxy)phenyl}sulfone (hereinafter referred to as "m-BAPS"), 1.0 g of β-butyrolactone, 1.6 g of pyridine, 300 g of NMP, and 30 g of toluene were placed in the same apparatus as used in Example 1. The contents of the flask were stirred for 3 hr in the same manner as in Example 1. The polyimide thus obtained had a molecular weight of about 30000.

Next, the resin composition thus obtained was subjected to steps 1 and 2 described in Example 1. The formed polyimide was measured for an infrared absorption spectrum. As a result, absorption characteristic of an imide ring was observed at 1,715 cm$^{-1}$ and 1,785 cm$^{-1}$.

Example 3

ODPA (31.02 g), 24.82 g of BCD, 15.21 g of DABz, 43.25 g of m-BAPS, 2.0 g of γ-caprolactone, 3.2 g of pyridine, 500 g of NMP, and 50 g of toluene were placed in the same apparatus as used in Example 1. The contents of the flask were stirred for 3 hr in the same manner as in Example 1. The polyimide thus obtained had a molecular weight of about 70000.

Next, the resin composition thus obtained was subjected to steps 1 and 2 described in Example 1. The formed polyimide was measured for an infrared absorption spectrum. As a result, absorption characteristic of an imide ring was observed at 1,715 cm$^{-1}$ and 1,785 cm$^{-1}$.

Example 4

3,3',4,4'-Benzophenonetetracarboxylic acid dianhydride (32.22 g), 29.42 g of 3,3',4,4'-biphenyltetracarboxylic acid dianhydride, 12.22 g of 2,4-diaminotoluene, 51.85 g of 2,2-bis{4-(4-aminophenoxy)phenyl}hexafluoropropane, 2.0 g of β-butyrolactone, 3.2 g of pyridine, 500 g of NMP, and 50 g of toluene were placed in the same apparatus as used in Example 1. The contents of the flask were stirred for 3 hr in the same manner as in Example 1. The polyimide thus obtained had a molecular weight of about 50000.

Next, the resin composition thus obtained was subjected to steps 1 and 2 described in Example 1. The formed polyimide was measured for an infrared absorption spectrum. As a result, absorption characteristic of an imide ring was observed at 1,715 cm$^{-1}$ and 1,785 cm$^{-1}$.

The molecular weight and the infrared absorption spectrum were measured by the following methods.

(1) Measurement of Molecular Weight

The number average molecular weight and the weight average molecular weight were measured using polystyrene as a standard by means of a model TSK gel GMH$_{HR}$-M gel column and a model UV-8020 detector, manufactured by Tosoh Corporation.

(2) Infrared Absorption Spectrum

A solder resist coated onto a copper foil was measured by a reflection method using MFT-2000 manufactured by Japan Spectroscopic Co., Ltd.

As described above, according to the production process of a polyimide according to the invention, the use of γ-caparolactone or β-butyrolactone as an acid catalyst in an organic polar solvent can realize the production of a polyimide which is soluble in a solvent and has high processability and stability.

The invention has been described in detail with particular reference to preferred embodiments, but it will be understood that variations and modifications can be effected within the scope of the invention as set forth in the appended claims.

What is claimed is:

1. A process for producing a polyimide having an average molecular weight of 10,000 to 300,000, said process comprising the step of heating an acid dianhydride and a diamine in an organic polar solvent in the presence of γ-caprolactone as an acid catalyst.

2. The process according to claim 1, wherein said diamine is one or two or more compounds selected from the group consisting of

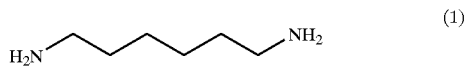

(1)

(2)

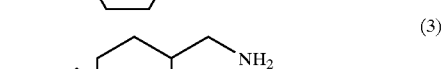

(3)

(4)

(5)

(6)

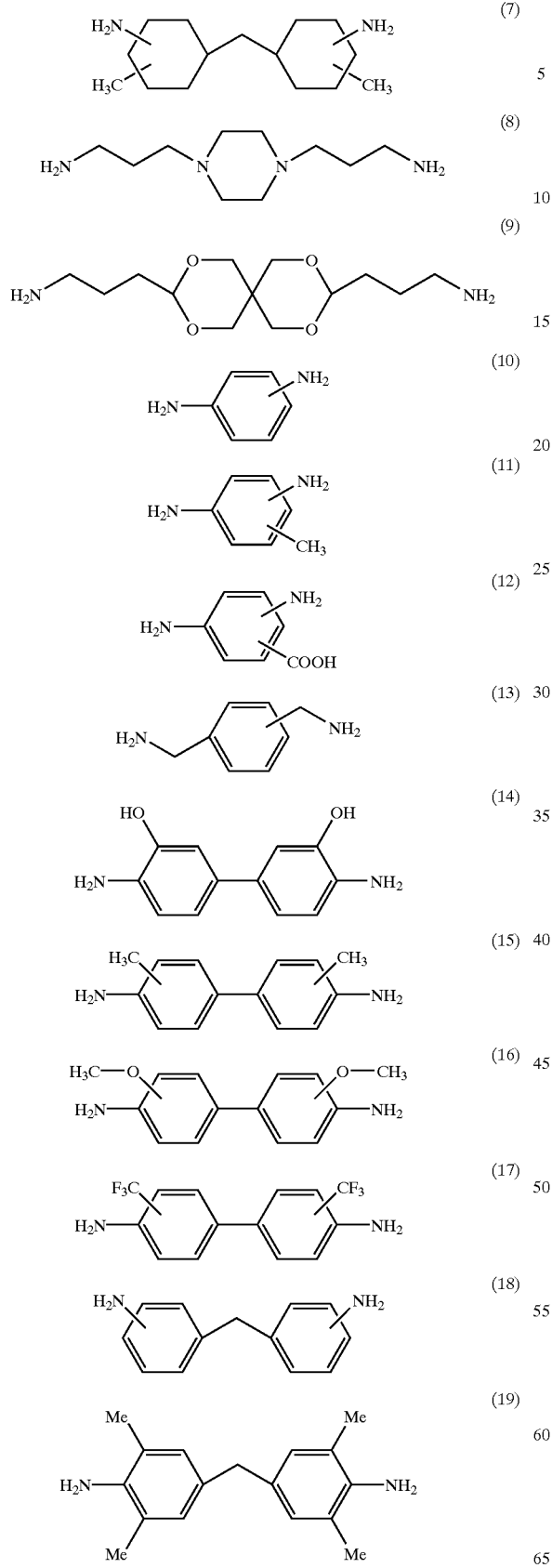
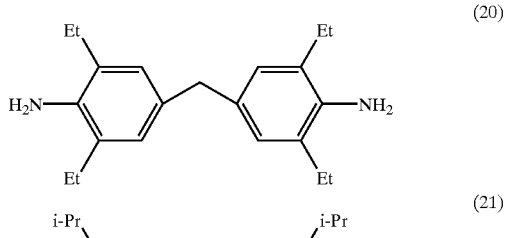
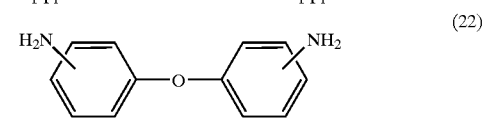
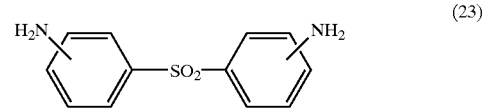
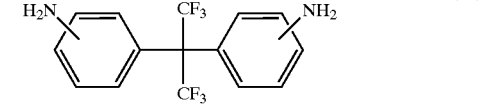
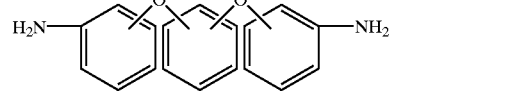
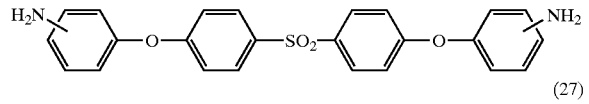
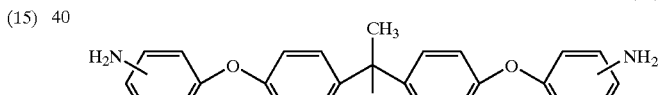
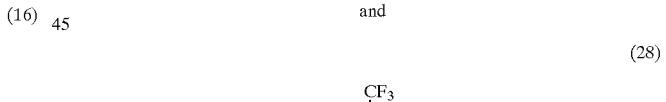
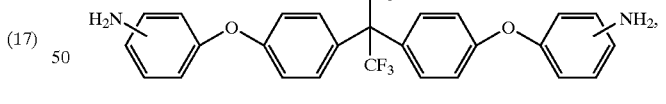
said acid dianhydride being one or two or more compounds selected from the group consisting of
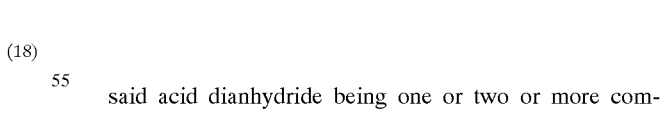

-continued
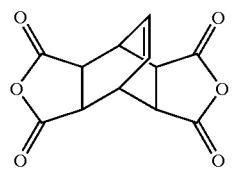
(30)
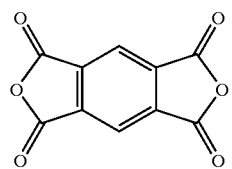
(31)
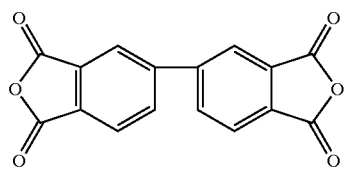
(32)
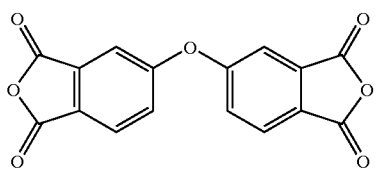
(33)
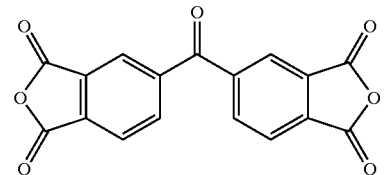
(34)
and
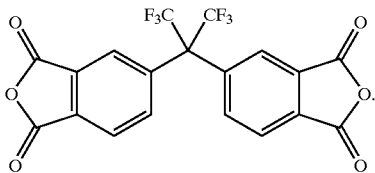
(35)
* * * * *